United States Patent [19]

Stadtfeld

[11] Patent Number: 5,895,180
[45] Date of Patent: Apr. 20, 1999

[54] METHOD OF DETERMINING CUTTING BLADE POSITIONAL ERRORS IN FACE HOBBING CUTTERS

[75] Inventor: Hermann J. Stadtfeld, Rochester, N.Y.

[73] Assignee: The Gleason Works, Rochester, N.Y.

[21] Appl. No.: 08/924,682

[22] Filed: Sep. 5, 1997

[51] Int. Cl.⁶ .................... B23F 9/14; B26D 1/12
[52] U.S. Cl. .................. 409/13; 407/22; 409/26
[58] Field of Search .................... 409/1, 12, 13, 409/26, 51, 63; 407/22

[56] References Cited

U.S. PATENT DOCUMENTS

| | | | |
|---|---|---|---|
| 2,766,664 | 10/1956 | Ciallie | 409/26 |
| 3,222,990 | 12/1965 | Rebeski | 409/26 |
| 4,060,881 | 12/1977 | Ryan et al. | 407/22 |
| 4,093,391 | 6/1978 | Bachmann et al. | 407/22 |
| 4,268,194 | 5/1981 | Bloink et al. | 407/22 |
| 4,353,671 | 10/1982 | Kotthaus | 409/26 |
| 4,525,108 | 6/1985 | Krenzer | 407/22 |
| 4,530,623 | 7/1985 | Kotthaus | 407/22 |
| 4,575,285 | 3/1986 | Blakesley | 407/115 |
| 4,621,954 | 11/1986 | Kitchen et al. | 407/22 |
| 5,116,173 | 5/1992 | Goldrich | 409/13 |

FOREIGN PATENT DOCUMENTS 9707930  3/1997  WIPO.

Primary Examiner—William Briggs
Attorney, Agent, or Firm—Robert L. McDowell

[57] ABSTRACT

A method for determining front-face indexing errors of like cutting blades mounted in a face hobbing cutter head. The cutter head is rotatable about a cutter axis and the like cutting blades (e.g. inside cutting blades or outside cutting blades) each having a cutting edge and are arranged in a plurality of blade groups in the cutter head. The method comprises determining the angular position of the front face of one or more of the like cutting blades about to the cutter axis by rotating the cutting edge of one or more of the like cutting blades relative to an angular detecting means, such as a non-contacting probe. The measured front face angular positions are compared with respective theoretical front face angular positions and an angular difference, $\Delta\phi_c$, is calculated. A cutting blade front face index error, $F_d$, is then calculated and this error amount may be compared to acceptable limits and the blade may be replaced of the cutter scrapped if such limits are exceeded. Alternatively, an error normal to flank, $N_c$, (a radially measured component) may be derived from the calculated front face index error, $F_d$, and the position of the cutting blade may be axially adjusted by an amount, $\Delta H$, to effectively reposition the cutting edge radially to compensate for the influence of the front face index error.

11 Claims, 4 Drawing Sheets

METHOD OF DETERMINING CUTTING BLADE POSITIONAL ERRORS IN FACE HOBBING CUTTERS

FIELD OF THE INVENTION

The present invention is directed generally to cutting tools for cutting bevel and hypoid gears having curved flanks. In particular, the present invention is directed to a method for determining front-face positional errors of cutting blades mounted in face-hobbing cutter heads.

BACKGROUND OF THE INVENTION

In the manufacture of bevel and hypoid gears with curved flank lines, the cutting tools utilized are primarily face mill or face hob cutters, such types of cutting tools are well known in the art of gear manufacture. In face mill cutters the cutting blades are arranged in the cutter head such that one tooth slot is formed with each plunge of the cutter and the cutter must be withdrawn and the workpiece indexed to the next tooth slot position in order to form the next tooth slot.

Face hobbing comprises cutting blades arranged about a cutter, not in line with each other, but in groups, usually pairs comprising an inner cutting blade and an outer cutting blade. Unlike most face milling processes, in which all cutting blades pass through the tooth slot during its formation, face hobbing comprises each successive group of cutting blades passing through respective successive tooth slot with each blade in the group forming a cut completely along the longitudinal portion of the tooth slot. The cutter and the workpiece rotate in a timed relationship with each other thereby allowing continual indexing of the workpiece and continual formation of each tooth slot of the gear. Thus, in face hobbing, a single plunge of the cutting tool results in all tooth slots of the workpiece being formed.

Cutting tools for face mill and face hob processes usually consist of disk-shaped cutter heads with stick-type cutting blades, made from bar stock tool steel for example, which are inserted and positioned in slots formed in the cutter heads. Each cutting blade comprises a front rake face, cutting edge, a cutting side surface oriented at a predetermined relief angle, clearance edge, clearance side surface, and a top surface. Examples of inserted stick-type cutter heads and blades are shown in U.S. Pat. Nos. 4,575,285 to Blakesley and 4,621,954 to Kitchen et al.

To have each blade of one kind, especially inner or outer blades, producing the same chip thickness and therefore having the same load and wear, the radial location of the cutting edge is most important. Tolerances of the blade shank and the cutting edge location relative to the shank as well as tolerances of "wear" of the slots in the cutter head can add up.

One method of measuring and truing both face milling and face hobbing cutters to correct radial location errors of cutting blades is disclosed in International Patent Application Publication No. WO 97/07930 in the name of The Gleason Works (Stadtfeld). In this method, the cutting side relief surface of the cutting blade is positioned substantially parallel to the offset travel direction of a probe. The cutting side relief surface is probed to determine the radial position of the cutting side and the position is recorded. The recorded position is compared with a predetermined position.

However, while the radial position of a cutting blade is important in both face milling and face hobbing operations, the position of the front face (index position) of a cutting blade is also important in face hobbing processes. This can be understood when the timed relationship between the rotating tool and rotating workpiece is considered. If a cutting blade is not in its proper position (index position) with respect to other like blades in the cutter head, the cutting blade will arrive either early or late to its respective tooth slot. As such, the chips removed from the tooth slot will be either thicker or thinner than those produced by other cutting blades in other tooth slots thus introducing uneven load and wear in the cutting tool.

It is an object of the present invention to provide a method of determining the amount of indexing error that exists in a face hobbing cutter.

It is another object of the present invention to provide a manner by which to adjust the cutting blades to account for any determined index error.

SUMMARY OF THE INVENTION

The present invention is directed to a method for determining front-face indexing errors of like cutting blades mounted in a face hobbing cutter head. The cutter head is rotatable about a cutter axis and the like cutting blades (e.g. inside cutting blades or outside cutting blades) each having a cutting edge and are arranged in a plurality of blade groups in the cutter head.

The inventive method comprises determining the angular position of the front face of one or more of the like cutting blades about to the cutter axis by rotating the cutting edge of one or more of the like cutting blades relative to an angular detecting means, such as a contacting or non-contacting probe. The measured front face angular positions are compared with respective theoretical front face angular positions and an angular difference, $\Delta\phi_c$, is calculated.

A cutting blade front face index error, $F_{ij}$, is then calculated and this error amount may be compared to acceptable limits and the blade may be replaced or the cutter scrapped if such limits are exceeded.

Alternatively, the calculated front face index error, $F_{ij}$, may be converted to an error normal to flank, $N_c$, and the position of the cutting blade may be axially adjusted by an amount, $\Delta H$, to compensate for the error normal to the tooth flank.

DETAILED DESCRIPTION OF THE PREFERRED EMBODIMENT

The present invention will now be discussed in detail with reference to the accompanying drawings. In all figures, like elements are referenced with the same reference numbers.

Figure 1:
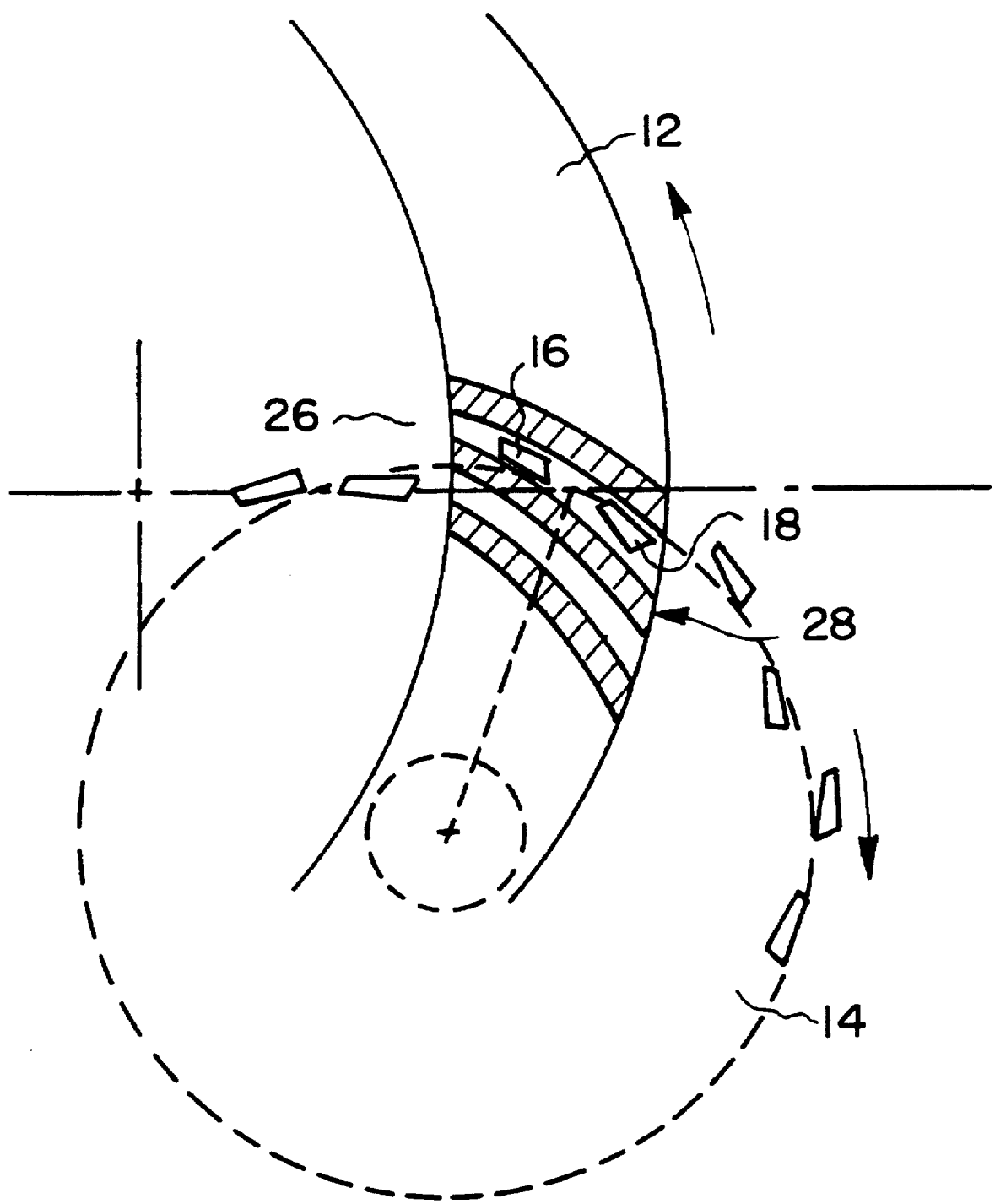
FIG. 1 illustrates the face hobbing process for forming bevel gears.

FIG. 1 shows a conventional process for forming face hobbed bevel gears. The work gear 12 and the cutter 14 rotate in a timed relationship. The cutter 14 has inside blades 16 which form the convex profiles 24 of the tooth flanks and outside blades 18 which form the concave profiles 22 of the tooth flanks. The cutting blades contact the work gear at the toe end 26 and exit at the heel end 28.

As previously stated, the position of the front face of the cutting blades is important in face hobbing processes (of either the generating or non-generating type). Due to the fact that the cutter head and gear blank are kinematically linked to each other in the cutting process and rotate at the same time in a predetermined timed ratio, an improper angle position of the front face (i.e. index error) of the cutting blades leads to different chip thicknesses.

Figure 2:
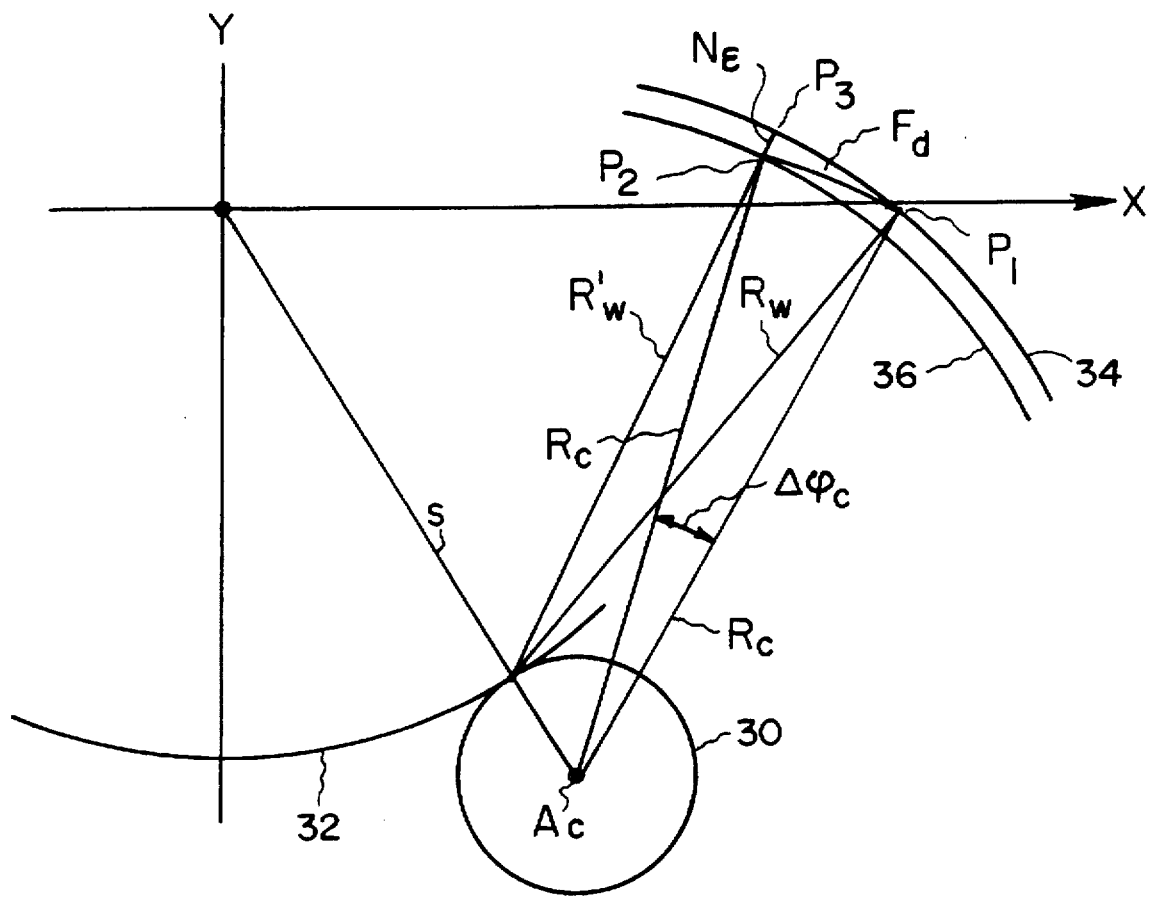
FIG. 2 diagrammatically illustrates an example of an angular positional error (index error) of the front face of a cutting blade in a face hobbing cutter head.

FIG. 2 diagrammatically illustrates an example of an angular positional error (index error) of the front face of a cutting blade in a face hobbing cutter head. In FIG. 2, the roll circle is designated by 30, the base circle by 32 and the radial distance is denoted by S. These components of FIG. 2 are well known in describing face hobbing processes and no further discussion thereof is believed necessary with regard to understanding the present invention.

In FIG. 2, point $P_1$ designates the desired (theoretical) location of the front face of a cutting blade for cutting tooth flank 34. The cutter axis is shown at $A_c$ and the nominal cutter radius is designated $R_c$. However, when passing the cutting blade past a detecting means (FIG. 4), such as a probe, preferably a non-contacting type probe (e.g. inductive proximity sensor), the actual location of the cutting edge, and hence the front face, is found to be at $P_2$ which is shown to lie on equidistant flank line 36.

Figure 3:
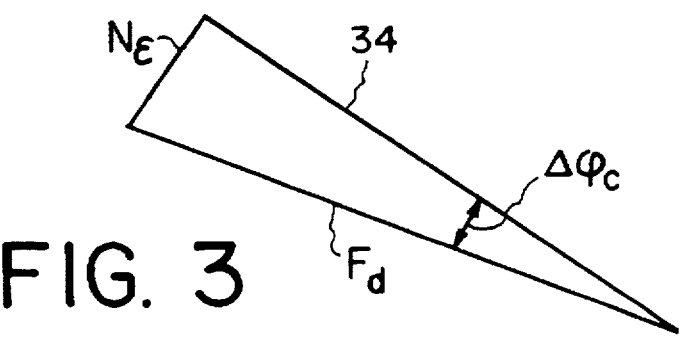
FIG. 3 is an enlarged view of the index error of FIG. 2 represented in triangular form.

Hence, the index error of the cutting blade face that exists between locations $P_1$ and $P_2$ can be represented by blade circle distance $F_d$ which is analogous to an angular amount of rotational error, $\Delta\phi_c$, about cutter axis $A_c$. Since the front face error, $F_d$, occurs with identical cutter radius, $R_c$, normal radii $R_n$ and $R'_n$, (normal to flank line 34) generate a lead line nearly identical to flank 34. Since the actual dimensions of any index error are usually very small with respect to the cutter head radius, on the order of less than 100 μm for example, the curved portions (i.e. tooth flank 34 and blade circle $F_d$) may be considered to be straight lines and thus the triangular arrangement of FIG. 3 is realized and the following relationships apply:

$\Delta\phi_c = \Delta\phi_{measurement} - (360°/\text{number of blade groups})$
[converted to radians]

where $\Delta\phi_c$ = angular rotational error, and, $\Delta\phi_{measurement}$ = angular measurement between successive like blades.

Once the angular rotational error is calculated, the front face error, $F_d$, may be determined from:

$F_d = \Delta\phi_c \times R_c$ where $\Delta\phi_c$ is in radians, and, $R_c$ = nominal cutter radius.

The front face error, $F_d$, may be compared to a predetermined tolerance limit amount and the cutting blade replaced or the cutting tool rejected if the predetermined tolerance amount is exceeded.

Alternatively, a radial (normal) error, $N_e$, may be derived from the front face error by calculating the error normal to the flank 34. This normal error, $N_e$, is formed by that portion of the normal cutter radius, $R'_n$, that extends between locations $P_2$ and $P_3$ as shown in FIG. 2. The normal error is determined by:

$N_e = F_d \sin \delta$ where $N_e$ = error normal to flank, $F_d$ = front face error, and, $\delta$ = theoretical blade offset angle.

The theoretical blade offset angle, $\delta$, can be calculated by using the following formula:

$\delta = \arcsin[Z_w \times m / 2 \times R_c]$ where $\delta$ = theoretical blade offset angle, $Z_w$ = number of blade groups, m = module, and, $R_c$ = nominal cutter radius.

The angle $\delta$ depends on the individual gear design. For example, if a cutter head with 17 blade starts and a radius of 88 mm is utilized, the above formula provides an angle of approximately 26° with an average module of 4.5 mm. The error influencing factor, sin δ, thus is 0.43. The radial (normal) influence, $N_e$, of front face error, $F_d$, is therefore, on average, approximately 40% of the front face error.

Figure 4:
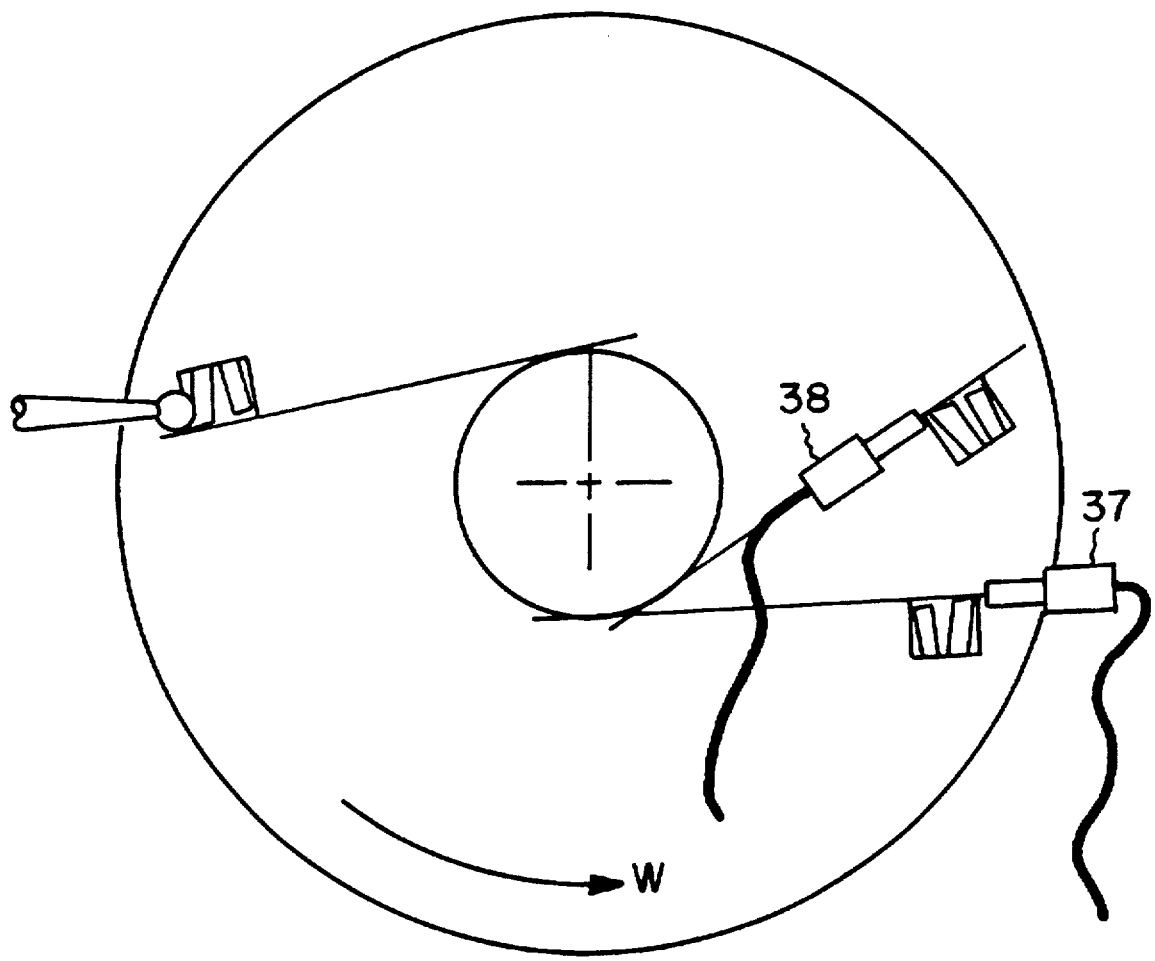
FIG. 4 illustrates an arrangement of proximity sensors for detecting the angular positions of the front faces of cutting blades in the inventive method.

A preferred arrangement for measuring the index error of like cutting blades on a face hobbing cutter is shown in FIG. 4. Non-contacting probes, such as inductive proximity sensors, are preferably arranged to emit a signal when the cutting edge of a like blade passes by, or, if contacting probes are utilized, when they come into contact with the cutting edge. In FIG. 4, outside blade proximity sensor 37 and inside blade proximity sensor 38 are connected to the machine computer which records readings from a cutter spindle encoder each time a proximity sensor emits a signal. One blade from each group of like blades is selected as a reference blade. The differences of angle values stored in the computer are then compared to the theoretical pitch (indexing) value and the indexing error of each cutting edge (blade front) is obtained as shown in the above equation for $\Delta\phi_c$.

The normal error, $N_e$, may be considered to represent an error component in the radial direction and as such it may be compensated for in a manner similar to the measured radial error in the above mentioned publication WO 97/07930 which corresponds to copending, commonly assigned U.S. patent application No. 08/698,834 the disclosure of which is hereby incorporated by reference. The normal error may be considered alone, or in combination with measured side relief (radial) error, discussed in the above application, to arrive at an amount by which the axial position of a cutting blade can be adjusted to correct such radial and/or indexing positional errors.

The following relationship may be utilized to determine the amount of axial adjustment of the cutter blade:

$\Delta H = (\Delta M - N_e) / \sin \alpha$ where $\Delta H$ = axial adjustment of cutting blade, $\Delta M$ = difference between measured radial position of cutting blade and theoretical radial position of cutting blade, $N_e$ = error normal to flank, and, $\alpha$ = blade pressure angle.

Of course, when considering normal error only, the above equation is reduced to:

$\Delta H = -N_e / \sin \alpha$

If desired, the sum of the error normal to the flank, $N_e$, and the radial error, $\Delta M$, may be added to define a total error value which may be compared to an effective overall error value which serves as an error tolerance limit. The total error value must be within the tolerance set forth by the overall error value. If the sum of measured radial error plus the radial error derived from the normal error exceeds the overall error value, the axial position of the cutting blade is adjusted in accordance with the above equation.

Figure 5:
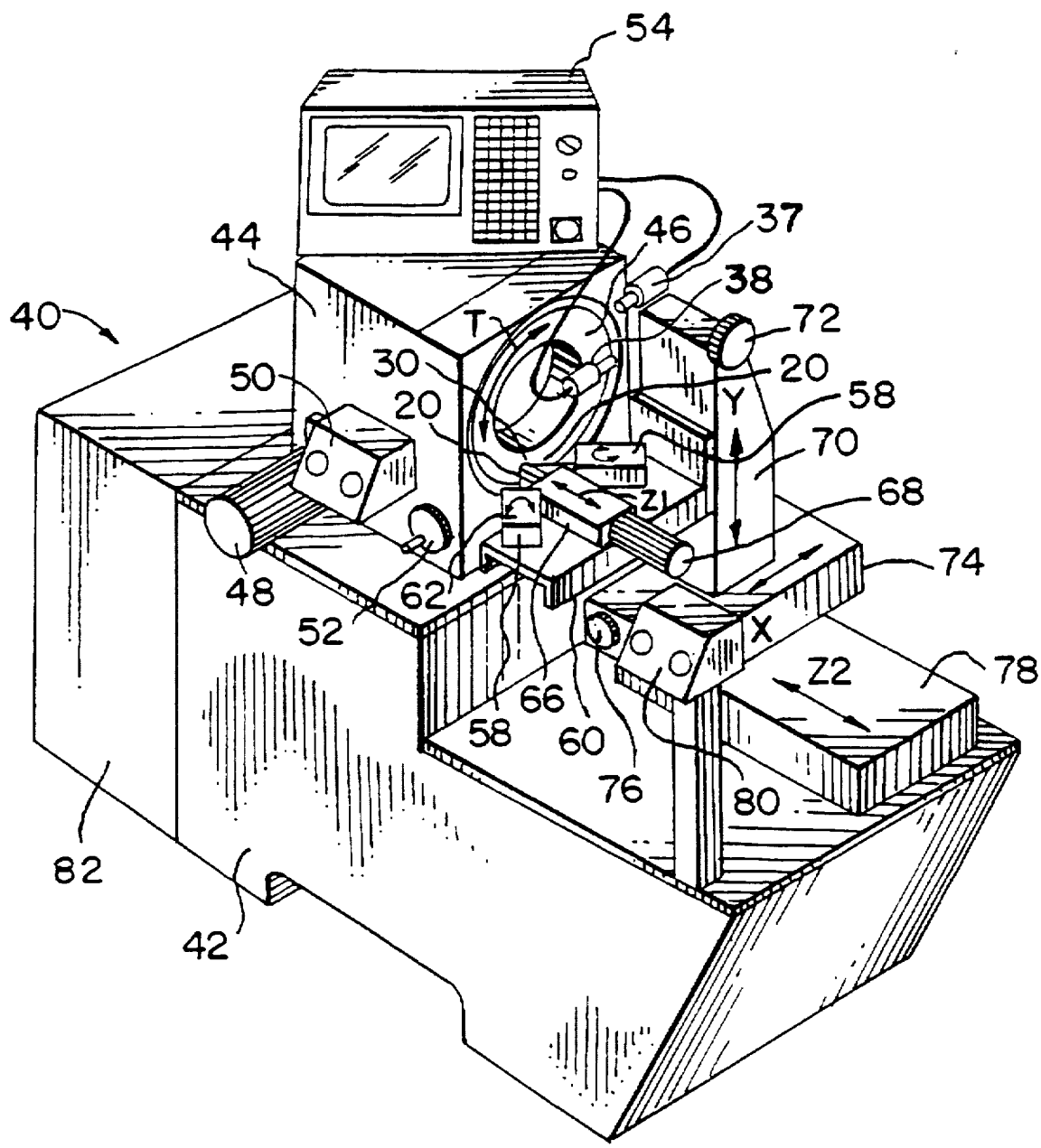
FIG. 5 schematically illustrates an apparatus on which the inventive method may be carried out.

FIG. 5 illustrates a truing/measuring apparatus 40 for carrying out the inventive process described above for face mill and/or face hob cutters. A similar apparatus is known from previously discussed published International Application No. WO 97/07930.

The apparatus 40 comprises a machine base 42 on which is mounted a tool spindle housing 44 containing a tool spindle 46 rotatable about a tool axis T. Rotation of tool spindle 46 is effected by a DC servo motor 48 in conjunction with anti-backlash, worm and wheel gearing (not shown). Positioning of the spindle is controlled by an rotary encoder (not shown), for example, a rotary encoder manufactured by Heidenhain Corporation, communicating with the controller in a closed-loop type feedback system. Palm button stations 50 and 80 include cycle start and emergency stop buttons and electronic handwheel 52 provides for rotating tool spindle 46 for setup and adjustment purposes. Control panel 54 comprises a display screen and a keyboard to input information into the machine controller which is any controller (e.g. PC with 386SX-25 mhz CPU, CNC, PLC) capable of multiple axes control. Electrical hardware is housed in electrical power cabinet 82.

Also mounted on machine base 42 is at least one, and preferably two contact measuring probes 20 (one for inside blades and one for outside blades), for example, contact-type measuring probes manufactured by Heidenhain Corporation, to indicate the radial position of the cutting blades. Alternatively, non-contact type probes may also be utilized. The probes are retractable into probe base 58 with the advance motion preferably being spring actuated and the retract motion electrically or vacuum actuated. The advance/retract motion may be controlled by the machine controller. Probes 20 and probe bases 58 are positioned on table 60 and are angularly adjustable (swivel adjustment) thereon as shown by arrow 62. The stop position of the probes may be indicated by any known arrangement such as a readable scale (not shown) located on probe base 58 or an electronic scale with readings being shown on the scale or the display screen.

Also shown are probes 37 and 38, either contacting type or non-contacting type, for detecting the angular position of the cutting edge (and hence the front face) of like cutting blades for determining the front face index error. Using the orientation of FIG. 4, probe 37 detects the cutting edges of outside cutting blades and probe 38 detects the cutting edges of inside cutting blades.

Table 60 also includes a blade stop 30 and base 66 mounted thereon. Blade stop 30 is linearly movable along an axis Z1 with the movement being effected by a servo motor 68 and the positioning controlled by a linear encoder (not shown), for example, a linear encoder manufactured by Heidenhain Corporation, communicating with the controller in a closed-loop type feedback system. The face of blade stop 30 is essentially flat and preferably comprises carbide material.

The table 60 is linearly movable along column 70 (Y-axis) to vertically position probes 20 and blade stop 30. Movement of table 60 along the Y-axis is effected manually by adjustment handle 72 working through a lead screw and nut or rack and pinion arrangement. Column 70 is positioned on slide 74 and is movable thereon to position probe(s) 20 and blade stop 30 along the width of the machine base 42 (X-axis) with movement being effected manually by adjustment handle 76 working through a lead screw and nut or rack and pinion arrangement. Slide 74 is positioned on slide 78 for advancing/retracting movement of probes 20 and blade stop 30 toward and away from (Z2-axis) the tool spindle 46 to provide the necessary clearance for loading and unloading cutters from tool spindle 46. Movement of slide 74 in the Z2 direction on slide 78 is effected by manually moving slide 74 toward and away from cutter spindle 46 with a stop and locking mechanism (not shown) being included to lock slide 74 in a repeatable advanced working position proximate tool spindle housing 44. Alternatively, movement of slide 74 along the Z2-axis may also be effected manually by an adjustment handle working through a lead screw and nut or rack and pinion arrangement.

The positions of table 60 along the Y-axis and column 70 along the X-axis, and, optionally, slide 74 along the Z2-axis, are preferably monitored by readable scales (not shown) located, respectively, on column 70 and slide 74. In alternative embodiments, electronic scales may be utilized to provide position readings for the Y, X, and/or Z axes and display the readings on the display screen, or, encoders and servo motors as part of the closed-loop feedback system may be utilized to monitor and control positions of components along the Y, X, and/or Z2 axes.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method for determining front-face indexing errors of like cutting blades mounted in a face hobbing cutter head rotatable about a cutter axis, said like cutting blades each having a cutting edge and being arranged in a plurality of blade groups in said cutter head, said method comprising:

determining the angular position of the front face of one or more of said like cutting blades with respect to said cutter axis by rotating the cutting edge of said like cutting blades relative to an angular detecting means, comparing the measured front face angular positions with respective theoretical front face angular positions and calculating an angular difference, $\Delta \phi_c$.

determining a cutting blade front face index error, $F_d$, according to $$F_d = \Delta \phi_c \times R_c$$

where $R_c$ = nominal cutter radius comparing said determined front face index error with a predetermined front face error tolerance range, and, axially adjusting the position of those cutting blades in said cutter head which have said determined front face index error outside of said predetermined tolerance range, said axial adjustment being in an amount to compensate for said determined front face error.

2. The method of claim 1 wherein said cutting blade is axially adjusted by an amount, $\Delta H$, to compensate for said front face, said amount being defined by:

$$\Delta H = -N_c / \sin \alpha$$

where $N_c$ = error normal to flank $\alpha$ = blade pressure angle and wherein $$N_c = F_d \sin \delta$$

where $\delta$ = theoretical blade offset angle.

3. The method of claim 2 wherein said amount, $\Delta H$, is further defined to include a radial adjustment to the position of said cutting blade, $\Delta H$ being defined as:

$\Delta H = (\Delta M - N_c)/\sin \alpha$ where $\Delta M$=difference between measured radial position of cutting blade and theoretical radial position of cutting blade.

4. The method of claim 1 wherein said angular detecting means comprises a probe.

5. The method of claim 4 wherein said probe comprises a non-contacting probe.

6. The method of claim 4 wherein said probe comprises a contacting probe.

7. The method of claim 1 wherein said like cutting blades comprise a first group of inside cutting blades and a second group of outside cutting blades and wherein each group of like cutting blades is associated with an angular position detecting means.

8. The method of claim 1 wherein said determined front face index error is converted to a corresponding radial error amount and added to a measured side relief radial error to define a total error value and wherein said total error value is compared to a predetermined effective overall error value, and, the position of those cutting blades in said cutter head which have said total error value in excess of said predetermined effective overall error value are axially adjusted by an amount to compensate for said total error.

9. A method for determining front-face indexing errors of like cutting blades mounted in a face hobbing cutter head rotatable about a cutter axis, said like cutting blades each having a cutting edge and being arranged in a plurality of blade groups in said cutter head, said method comprising:

determining the angular position of the front face of one or more of said like cutting blades with respect to said cutter axis by rotating the cutting edge of said like cutting blades relative to an angular position detecting means.

comparing the measured front face angular positions with respective theoretical front face angular positions and calculating an angular difference $\Delta \phi_c$.

determining a cutting blade front face index error, $F_d$, according to $F_d = \Delta \phi_c \times R_c$ where $R_c$=nominal cutter radius.

converting said blade front face index error to an error normal to flank, $N_c$, according to $N_c = F_d \sin \delta$ where $\delta$=theoretical blade offset angle and, axially adjusting the position of said cutting blade by an amount, $\Delta H$, to compensate for said error normal to said flank, said amount being defined by $\Delta H = -N_c/\sin \alpha$ where $\alpha$=blade pressure angle.

10. The method of claim 9 wherein said amount, $\Delta H$, is further defined to include a radial adjustment to the position of said cutting blade, $\Delta H$ being defined as:

$\Delta H = (\Delta M - N_c)/\sin \alpha$ where $\Delta M$=difference between measured radial position of cutting blade and theoretical radial position of cutting blade.

11. A method for determining front-face indexing errors of like cutting blades mounted in a face hobbing cutter head rotatable about a cutter axis, said like cutting blades each having a cutting edge and being arranged in a plurality of blade groups in said cutter head, said method comprising:

determining the angular position of the front face of one or more of said like cutting blades with respect to said cutter axis by rotating the cutting edge of said like cutting blades relative to an angular detecting means.

comparing the measured front face angular positions with respective theoretical front face angular positions and calculating an angular difference, $\Delta \phi_c$.

determining a cutting blade front face index error, $F_d$, according to $F_d = \Delta \phi_c R_c$ where $R_c$=nominal cutter radius, comparing said determined front face index error with a predetermined front face error tolerance range, and.

removing those cutting blades in said cutter head which have said determined front face index error outside of said predetermined tolerance range, and, positioning other like cutting blades in said cutter head.

* * * * *